(12) United States Patent
Mitsuyama et al.

(10) Patent No.: US 8,758,454 B2
(45) Date of Patent: Jun. 24, 2014

(54) SOLID ELECTROLYTIC CAPACITOR AND METHOD FOR MANUFACTURING THE SAME

(75) Inventors: Tomohiro Mitsuyama, Hirakata (JP); Toshiyuki Kato, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 182 days.

(21) Appl. No.: 13/429,513

(22) Filed: Mar. 26, 2012

(65) Prior Publication Data

US 2012/0250227 A1  Oct. 4, 2012

(30) Foreign Application Priority Data

Mar. 29, 2011 (JP) ................. 2011-071404

(51) Int. Cl.
*H01G 9/07* (2006.01)
*H01G 9/15* (2006.01)
*H01G 9/00* (2006.01)

(52) U.S. Cl.
CPC .............. *H01G 9/0032* (2013.01); *H01G 9/07* (2013.01); *H01G 9/15* (2013.01); *H01G 9/0036* (2013.01)
USPC .......................... 29/25.03; 29/25.42; 361/524

(58) Field of Classification Search
CPC ..... H01G 9/0032; H01G 9/0036; H01G 9/07; H01G 9/15
USPC ........................ 29/25.03, 25.42; 361/523, 524
See application file for complete search history.

(56) References Cited

U.S. PATENT DOCUMENTS 5,005,107 A * 4/1991 Kobashi et al. ............... 361/540
5,586,000 A * 12/1996 Sakata et al. .................. 361/525
5,790,368 A    8/1998 Naito et al.
6,473,293 B2 * 10/2002 Shimada et al. ............... 361/523
6,894,890 B2 *  5/2005 Takatani et al. ............... 361/532
7,760,489 B2 *  7/2010 Fujita et al. ................... 361/528
7,800,887 B2 *  9/2010 Iida et al. ...................... 361/525
7,821,772 B2 * 10/2010 Kobayashi et al. ........... 361/525
7,855,869 B2 * 12/2010 Nishimura et al. ........... 361/523
8,035,953 B2 * 10/2011 Nemoto et al. ............... 361/532
2009/0208640 A1   8/2009 Song et al.

FOREIGN PATENT DOCUMENTS

| JP | 60-060709 A | 4/1985 |
| JP | 09-017685 A | 1/1997 |
| JP | 09017686 A | 1/1997 |
| JP | 11-074156 A | 3/1999 |
| JP | 2003-206135 A | 7/2003 |
| JP | 2007-036237 A | 2/2007 |

* cited by examiner

Primary Examiner — Evan Pert
(74) Attorney, Agent, or Firm — Marvin A. Motsenbocker; Mots Law, PLLC

(57) ABSTRACT

Provided are a tantalum solid electrolytic capacitor having a reduced leakage current and a method for manufacturing the tantalum solid electrolytic capacitor. A dielectric layer of the solid electrolytic capacitor includes a first dielectric layer in contact with an anode and a second dielectric layer covering the first dielectric layer and making contact with an electrolyte layer. The first dielectric layer is made of an oxide of the anode, the oxide consisting essentially of an amorphous component. The second dielectric layer is formed of dielectric particles having a higher dielectric constant than the first dielectric layer. The dielectric particles includes first dielectric particles in contact with the first dielectric layer and second dielectric particles out of contact with the first dielectric layer. The first dielectric particles have a smaller average particle diameter than the second dielectric particles.

4 Claims, 7 Drawing Sheets (a)

(b)

(a)

(b)

(a)

(b)

SOLID ELECTROLYTIC CAPACITOR AND METHOD FOR MANUFACTURING THE SAME

BACKGROUND OF THE INVENTION

1. Field of the Invention

This invention relates to solid electrolytic capacitors employing tantalum or an alloy thereof as the anode material and methods for manufacturing the same.

2. Description of Related Arts

With the recent trend toward increasing range of functions of electronic devices including personal computers and portable game machines, electronic components mounted in the electronic devices are being required to reduce the power consumption.

One of these electronic components is a solid electrolytic capacitor employing tantalum as the anode material (hereinafter referred to as a tantalum solid electrolytic capacitor), which is also being required to reduce the power consumption.

A conventional tantalum solid electrolytic capacitor includes a dielectric layer of tantalum oxide formed on the anode by anodizing the anode made of tantalum in an aqueous electrolyte solution, such as phosphoric acid (see, for example, JP-A-H11-74156). To reduce the power consumption of the tantalum solid electrolytic capacitor, it is necessary to reduce the leakage current flowing through the dielectric layer.

SUMMARY OF THE INVENTION

However, the conventional tantalum solid electrolytic capacitor cannot sufficiently reduce the leakage current.

With the foregoing in mind, an object of the present invention is to provide a solid electrolytic capacitor having a sufficiently reduced leakage current even with the use of tantalum or an alloy thereof as the anode material, and a method for manufacturing the solid electrolytic capacitor.

A solid electrolytic capacitor according to a first aspect of the present invention is a solid electrolytic capacitor including: an anode made of tantalum or a tantalum-based alloy; a dielectric layer covering the anode; and an electrolyte layer covering the dielectric layer, wherein the dielectric layer includes a first dielectric layer making contact with the anode and a second dielectric layer covering the first dielectric layer and making contact with the electrolyte layer, the first dielectric layer is made of an oxide of the anode, the oxide consisting essentially of an amorphous component, and the second dielectric layer is formed of dielectric particles having a higher dielectric constant than the first dielectric layer, the dielectric particles including first dielectric particles in contact with the first dielectric layer and second dielectric particles out of contact with the first dielectric layer, the first dielectric particles having a smaller average particle diameter than the second dielectric particles.

As just described, in the solid electrolytic capacitor according to the first aspect of the present invention, the first dielectric layer is made of an anode oxide consisting essentially of an amorphous component, the second dielectric layer is formed of dielectric particles including first dielectric particles and second dielectric particles, and the first dielectric particles of smaller average particle diameter are in contact with the first dielectric layer. Thus, the adhesion between the first dielectric layer and the second dielectric layer can be increased to improve the film quality of the entire dielectric layer. As a result, a solid electrolytic capacitor can be provided which has a reduced leakage current.

A method for manufacturing a solid electrolytic capacitor according to a second aspect of the present invention includes the steps of: forming an anode made of tantalum or a tantalum-based alloy; forming a thin titanium film on a surface of the anode; hydrothermally treating the anode with the thin titanium film formed thereon while applying a voltage to the anode in an aqueous electrolyte solution, thereby anodizing the anode to form a first dielectric layer consisting essentially of an amorphous component and form a second dielectric layer converted from the thin titanium film, making contact with the first dielectric layer, and formed of dielectric particles having a higher dielectric constant than the first dielectric layer; and forming an electrolyte layer on the surface of the second dielectric layer.

As just described, in the method for manufacturing a solid electrolytic capacitor according to the second aspect of the present invention, the anode is hydrothermally treated while a voltage is applied thereto in an aqueous electrolyte solution. Therefore, the first dielectric layer consisting essentially of an amorphous component and the second dielectric layer formed of dielectric particles can be formed in a single step.

In accordance with the present invention, a tantalum solid electrolytic capacitor having a reduced leakage current and a method for manufacturing the tantalum solid electrolytic capacitor can be provided.

DETAILED DESCRIPTION OF PREFERRED EMBODIMENTS

Figure 1:
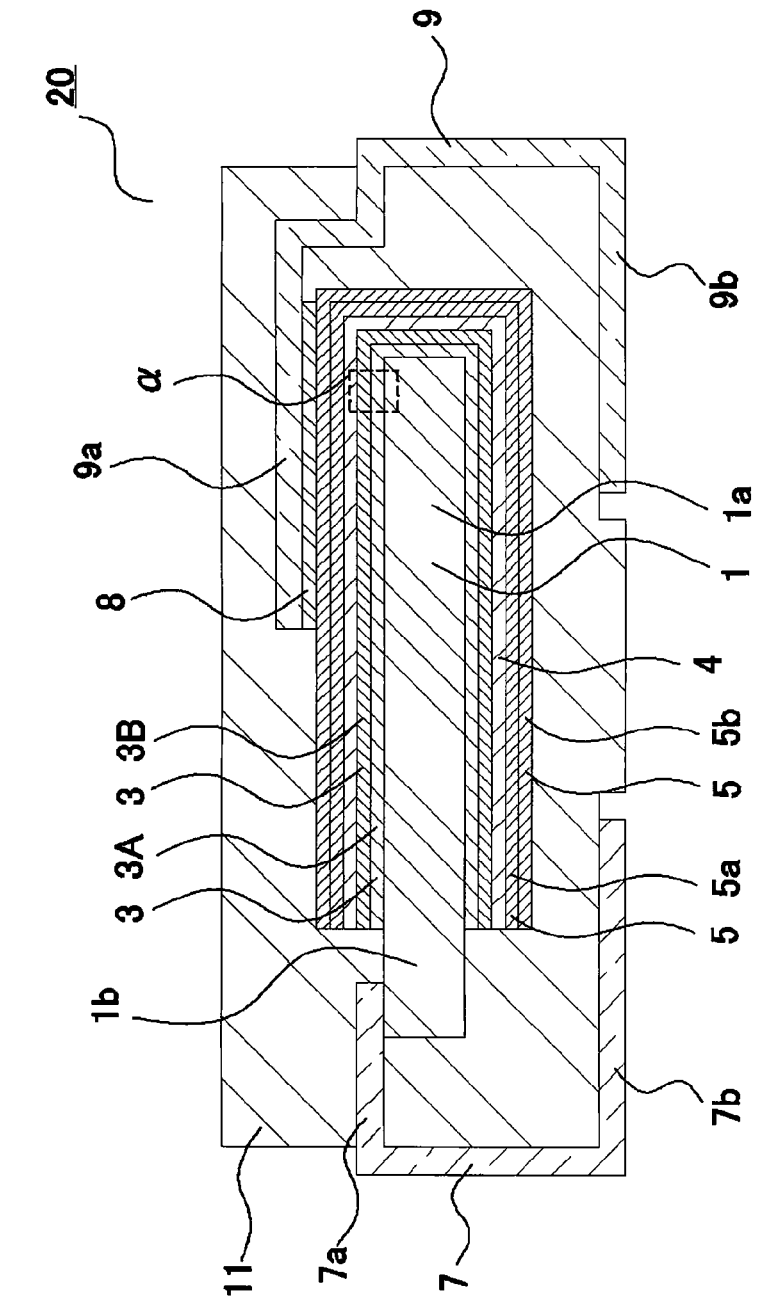
FIG. 1 is a schematic cross-sectional view for illustrating a tantalum solid electrolytic capacitor of a first embodiment.

Next, a description will be given of embodiments of the present invention with reference to the drawings. Throughout the drawings described below, the same or like reference numerals refer to the same or like parts. However, it should be noted that each drawing is a schematic view and may represent different dimensional ratios and the like from those of the actual solid electrolytic capacitor. Therefore, specific dimensions and the like should be determined in consideration of the following descriptions. Furthermore, it is a matter of course that different drawings include elements which have different dimensional relations and ratios.

First Embodiment

FIG. 1 is a schematic cross-sectional view for illustrating the interior of a tantalum solid electrolytic capacitor 20 of this embodiment.

The tantalum solid electrolytic capacitor 20 of this embodiment has the outer shape of a rectangular box and, as shown in FIG. 1, includes an anode 1, a dielectric layer 3 formed to cover one end portion 1a of the anode 1, an electrolyte layer 4 covering the dielectric layer 3, and a cathode extraction layer 5 covering the electrolyte layer 4. An anode terminal 7 is connected to the other end portion 1b of the anode 1, and a cathode terminal 9 is bonded to the cathode extraction layer 5 by a conductive adhesive 8. Furthermore, a resin outer package 11 is formed to expose respective portions of the anode terminal 7 and the cathode terminal 9 to the outside.

Hereinafter, a description will be given of a specific structure of the tantalum solid electrolytic capacitor 20 of this embodiment.

The anode 1 used is a sheet of foil made of tantalum serving as a valve metal or a sheet of foil containing tantalum as a major component. The material of the foil forming the anode 1 is not limited to pure tantalum and may be a tantalum-based alloy with another metal. The tantalum-based alloy that can be used is a tantalum alloy consisting mostly of tantalum and preferred examples thereof include tantalum alloys in which the weight of additive contained in the tantalum alloy is 10% or less of the total weight of the tantalum alloy. Examples of the additive contained in the tantalum alloy include silicon, vanadium, boron, and nitrogen. The tantalum alloy is formed by adding such an additive to tantalum.

Figure 2:
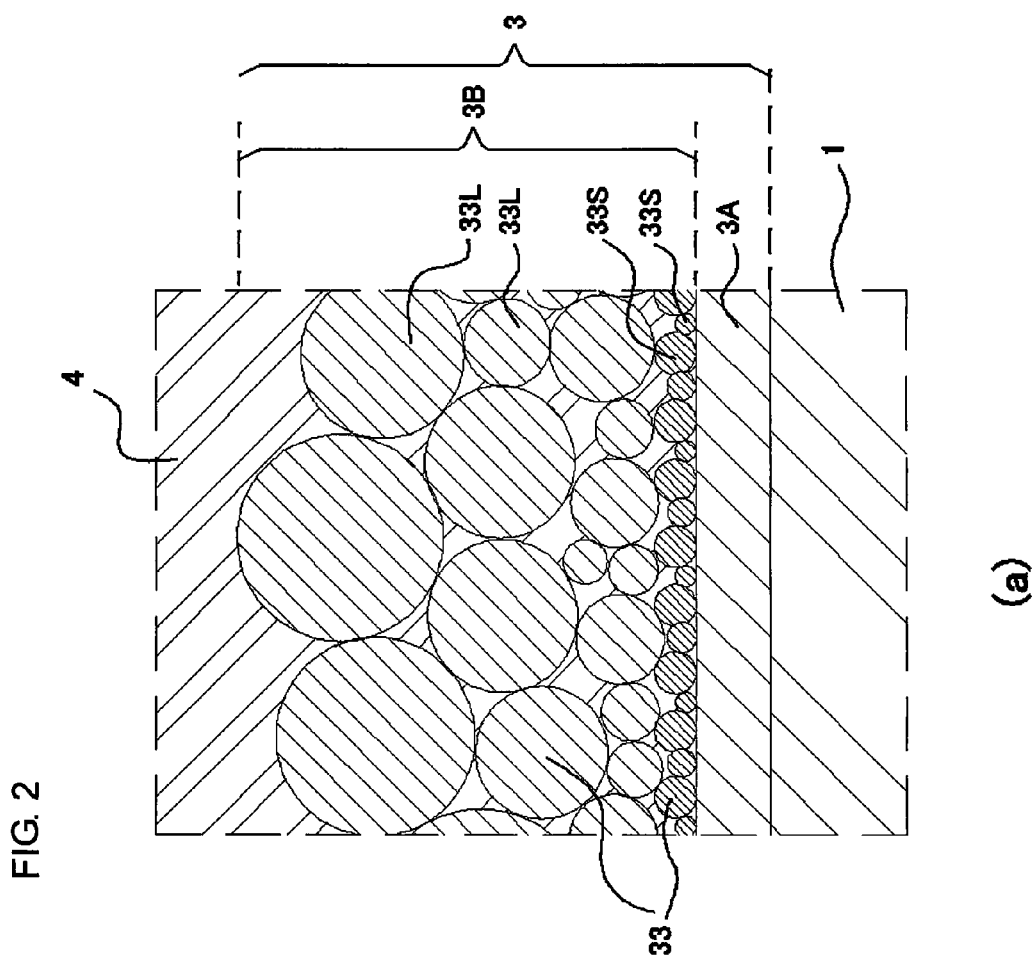
FIG. 2 shows a schematic enlarged cross-sectional view of a region enclosed by the broken line α in FIG. 1 and cross-sectional views of different dielectric particles.
Figure 2:
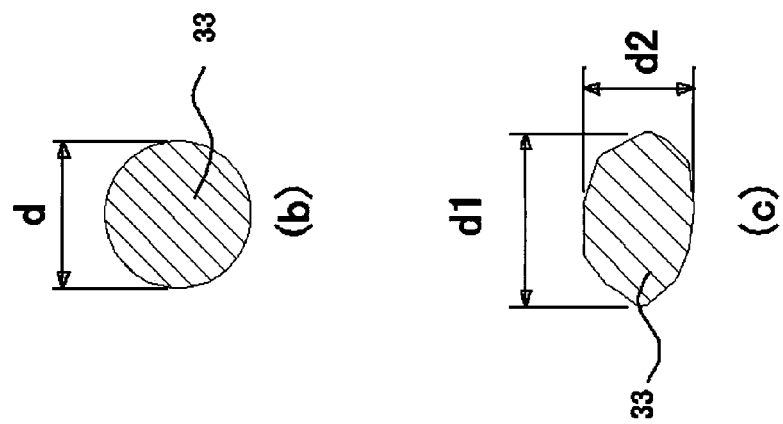

The dielectric layer 3 includes, as shown in FIG. 1, a first dielectric layer 3A covering the anode 1 and a second dielectric layer 3B covering the first dielectric layer 3A and making contact with the electrolyte layer 4. FIG. 2(a) is a schematic enlarged cross-sectional view of a region enclosed by the broken line α in FIG. 1, for illustrating the interior of the tantalum solid electrolytic capacitor 20 of this embodiment. The first dielectric layer 3A is formed on the anode 1 and is composed of a layer of tantalum oxide ($Ta_2O_5$) consisting essentially of an amorphous component. The second dielectric layer 3B is formed of dielectric particles 33. In this embodiment, the dielectric particle 33 is formed of a crystalline particle of barium titanate ($BaTiO_3$) having a higher dielectric constant than the first dielectric layer 3A. Barium titanate and like oxides have a very high relative dielectric constant of approximately 1000 to 6000, compared to tantalum oxide having a relative dielectric constant of approximately 27. Note that FIG. 2(a) shows a cross-sectional view in the case of formation of spherical dielectric particles 33 and, therefore, the dielectric particles 33 have a circular cross-sectional shape.

The dielectric particles 33 include first dielectric particles 33S in contact with the first dielectric layer 3A and second dielectric particles 33L out of contact with the first dielectric layer 3A, and the average particle diameter of the first dielectric particles 33S is smaller than that of the second dielectric particles 33L. FIG. 2(b) is a view showing the sites on the dielectric particle 33 at which the particle diameter d is to be measured in order to determine the average particle diameters of the first and second dielectric particles 33S and 33L constituting the dielectric particles 33. Since as described previously the cross section of the dielectric particle 33 in this embodiment is circular, the particle diameter d of the dielectric particle 33 can be determined from the diameter of the circular cross section, as shown in FIG. 2(b). The particle diameter d of the dielectric particle 33 can be measured by observing the cross section of the tantalum solid electrolytic capacitor with a transmission electron microscope (TEM). The average particle diameter of the dielectric particles 33 can be determined by randomly selecting about ten dielectric particles 33 from the same cross section of the tantalum solid electrolytic capacitor 20, measuring the particle diameters d of the ten particles, and calculating the average value of the ten measured particle diameters. In this manner, the average particle diameter of the first dielectric particles 33S constituting part of the dielectric particles 33 can be determined by randomly selecting a given number of particles in contact with the first dielectric layer 3A, measuring the particle diameters thereof, and calculating the average value of the measured particle diameters. Likewise, the average particle diameter of the second dielectric particles 33L constituting part of the dielectric particles 33 can be determined by randomly selecting a given number of particles out of contact with the first dielectric layer 3A, measuring the particle diameters thereof, and calculating the average value of the measured particle diameters.

In this embodiment, the particle diameters d of the dielectric particles 33 (first dielectric particles 33S and second dielectric particles 33L) are measured at cross sections of the dielectric particles 33. Since the dielectric particles 33 are spherical, the measured particle diameters d of the dielectric particles 33 vary depending upon their cutting plane. However, since in determining the average particle diameters of the first and second dielectric particles 33S and 33L, the particle diameters of the first and second dielectric particles 33S and 33L randomly selected from the same cross section of the tantalum solid electrolytic capacitor 20 are measured and the measured values are averaged, the comparison between the average particle diameters of the first and second dielectric particles 33S and 33L can be made adequately.

The shape of the dielectric particles 33 is not limited to the above shape and may be any different shape. For example, the dielectric particles 33 may be asymmetric particles and have such a cross-sectional shape as shown in FIG. 2(c). In such a case, the long diameter d1 and short diameter d2 of the dielectric particle 33 are first measured. The value employed as the long diameter d1 is the maximum of all the measured tangential diameters of the dielectric particle 33 which are distances between parallel tangent lines thereof, as shown in the figure. The value employed as the short diameter d2 is the maximum of the measured tangential diameters of the dielectric particle 33 which are substantially orthogonal to the direction of the long diameter d1. Then, the measured long diameter d1 and short diameter d2 are averaged ((d1+d2)/2) and the obtained average value is taken as the particle diameter of the dielectric particle 33. Next, a certain number of dielectric particles 33 are measured in terms of particle diameter in the above manner of measurement and the measured values are averaged, so that the average particle diameter of the dielectric particles 33 can be obtained.

The electrolyte layer 4 is, as shown in FIGS. 1 and 2(a), formed on the surface of the second dielectric layer 3B. Furthermore, as shown in FIG. 2(a), the electrolyte layer 4 is also formed in spaces between the second dielectric particles 33L. The electrolyte layer 4 may also be formed on portions of the first dielectric layer 3A exposed from the second dielectric layer 3B. Examples of the material that can be used for the electrolyte layer 4 include conductive polymers and manganese dioxide. The conductive polymers can be formed such as by chemical polymerization or electropolymerization and examples of materials thereof include polypyrrole, polythiophene, polyaniline, and polyfuran. The electrolyte layer 4 may be formed of a single layer or formed of a plurality of layers.

The cathode extraction layer 5 is formed to cover the electrolyte layer 4, and has a layered structure in which a carbon layer 5a and a silver paste layer 5b are formed in this order on the electrolyte layer 4. The carbon layer 5a is formed of a layer containing carbon particles. Thus, the cathode extraction layer 5 is formed on and in direct contact with the electrolyte layer 4.

The cathode terminal 9 is attached to the cathode extraction layer 5. Specifically, the cathode terminal 9 is formed by bending a metal strip. As shown in FIG. 1, the underside of one end portion 9a of the cathode terminal 9 is bonded to the cathode extraction layer 5 by a conductive adhesive 8, whereby the cathode terminal 9 and the cathode extraction layer 5 are mechanically and electrically connected to each other. A specific example of the material for the conductive adhesive 8 is a silver paste made by mixing silver and epoxy resin.

The cathode extraction layer 5 may be composed of either one of the carbon layer 5a and the silver paste layer 5b, and can have various structures so long as it can electrically connect the electrolyte layer 4 to the cathode terminal 9.

The anode terminal 7 is attached to the other end portion 1b of the anode 1. Specifically, the anode terminal 7 is formed by bending a metal strip. As shown in FIG. 1, the underside of one end portion 7a of the anode terminal 7 is mechanically and electrically connected to the other end portion 1b of the anode 1 by welding or otherwise.

Examples of materials for the anode terminal 7 and the cathode terminal 9 include copper, copper alloys, and iron-nickel alloy (42 alloy).

The resin outer package 11 is formed to cover exposed surrounding surfaces of the anode 1, the cathode extraction layer 5, the anode terminal 7, and the cathode terminal 9 which are arranged as above. The other end portion 7b of the anode terminal 7 and the other end portion 9b of the cathode terminal 9 are exposed to the outside to extend from the side surfaces to the bottom surface of the resin outer package 11. The exposed portions of the terminals 7 and 9 can be used for soldering to a substrate. Examples of materials that can be used for the resin outer package 11 include materials functioning as sealants, and specific examples thereof include epoxy resin and silicone resin. The resin outer package 11 can be formed by curing a resin prepared by appropriately mixing a base resin, a hardener, and a filler.

(Functions and Effects)

As described so far, in the tantalum solid electrolytic capacitor 20 of this embodiment, the first dielectric layer 3A is made of an amorphous oxide ($Ta_2O_5$) of the anode made of tantalum or an alloy thereof, the second dielectric layer 3B is formed of dielectric particles 33 including the first and second dielectric particles 33S and 33L, and the first dielectric particles 33S having a smaller average particle diameter are in contact with the first dielectric layer 3A. Thus, the adhesion between the first dielectric layer 3A and the second dielectric layer 3B can be increased to improve the film quality of the entire dielectric layer 3. Therefore, in this embodiment, a tantalum solid electrolytic capacitor 20 having a reduced leakage current can be provided.

Furthermore, the tantalum solid electrolytic capacitor 20 of this embodiment includes the second dielectric layer 3B formed of dielectric particles 33 having a higher dielectric constant than the first dielectric layer 3A. Since the second dielectric layer 3B is formed of dielectric particles 33 having a higher dielectric constant than the first dielectric layer 3A, this can increase the dielectric constant of the entire dielectric layer 3.

Moreover, since the average particle diameter of the second dielectric particles 33L out of contact with the first dielectric layer 3A is greater than that of the first dielectric particles 33S, the dielectric constant of the second dielectric layer 3B can be efficiently increased, which also increases the dielectric constant of the entire dielectric layer 3.

Furthermore, the average particle diameter of the second dielectric particles 33L is greater than that of the first dielectric particles 33S. Thus, the voids between the second dielectric particles 33L can be increased in size, so that the adhesion between the dielectric layer 3 and the electrolyte layer 4 can be increased.

Moreover, in this embodiment, the dielectric particle 33 is formed of a crystalline particle of barium titanate. It can be assumed that if such high-crystallinity dielectric particles 33 are formed directly on the anode 1, the leakage current will significantly increase because of the crystallinity. In consideration of this, in this embodiment, the first dielectric layer 3A consisting essentially of amorphous component is provided between the anode 1 and the second dielectric layer 3B formed of crystalline particles of barium titanate so that the first dielectric particles 33S of small average particle diameter make contact with the first dielectric layer 3A. Therefore, even with the use of high-crystallinity dielectric particles 33 for the dielectric layer, a tantalum solid electrolytic capacitor having a reduced leakage current can be formed.

(Manufacturing Method of Tantalum Solid Electrolytic Capacitor of First Embodiment)

Hereinafter, a description will be given of a method for manufacturing the tantalum solid electrolytic capacitor of this embodiment.

Figure 3:
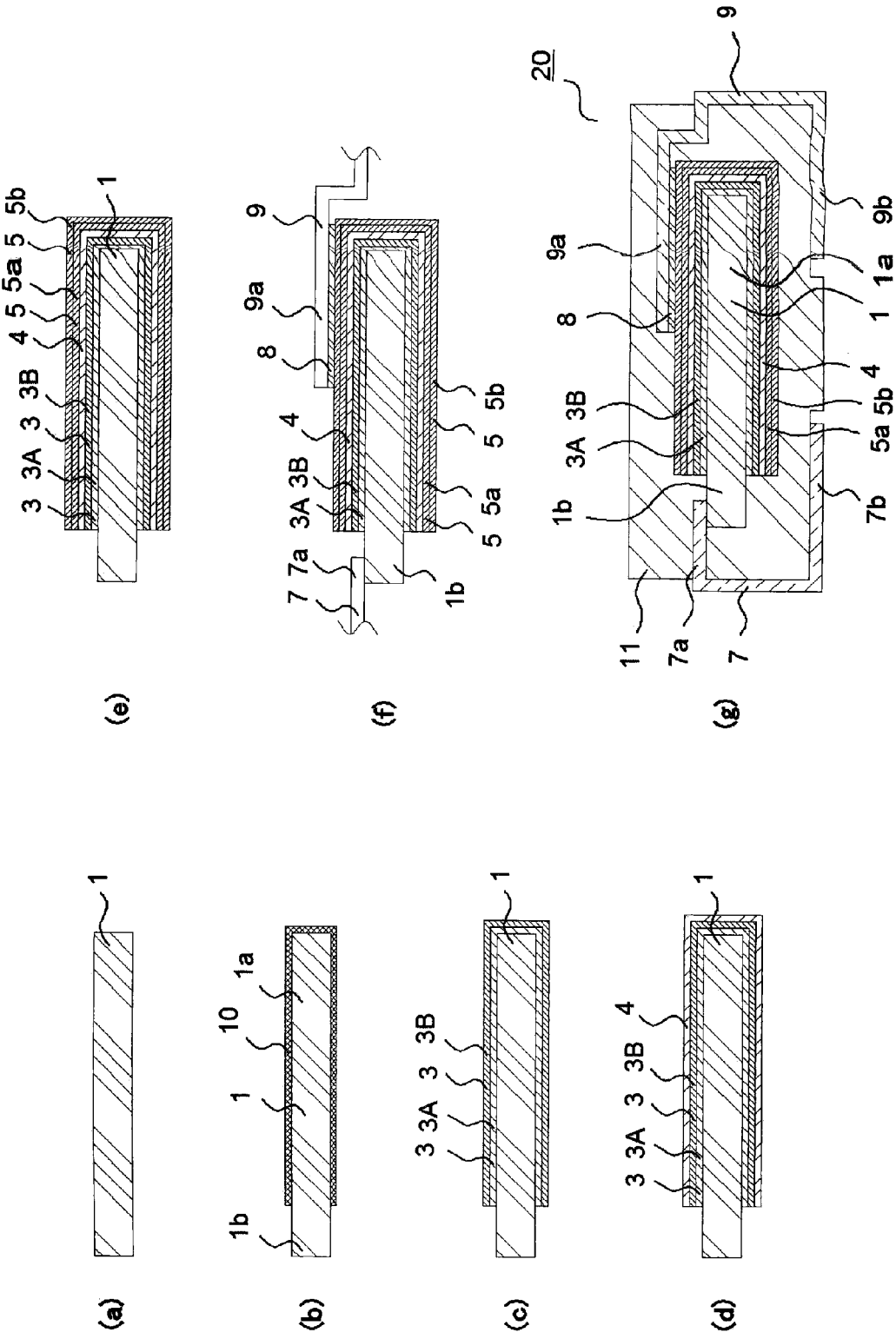
FIG. 3 shows views for illustrating manufacturing steps of the tantalum solid electrolytic capacitor of the first embodiment.

FIG. 3 shows views for illustrating manufacturing steps of the tantalum solid electrolytic capacitor of this embodiment.

<Step 1: Formation of Anode>

As shown in FIG. 3(a), the material used as an anode 1 is a thin sheet of tantalum foil with a length of 40 mm, a width of 20 mm, and a thickness of 0.1 mm.

<Step 2: Formation of Thin Titanium Film>

As shown in FIG. 3(b), a thin titanium film 10 with a thickness of approximately 10 to 500 nm is formed on the surface of the anode 1 by sputtering. Note that the thin titanium film 10 may be formed, by masking the other end portion 1b of the anode 1, only on one end portion 1b of the anode 1 on which a dielectric layer 3 described hereinafter is to be formed as shown in this figure, or formed to cover the entire region of the anode 1. Even when the thin titanium film 10 is formed to cover the entire region of the anode 1, the connection of an anode terminal 7 to the anode 1 in the later step is not prevented. The thin titanium film 10 can be formed by various methods other than sputtering, such as vapor deposition.

<Step 3: Formation of Dielectric Layer (Hydrothermal Treatment Step)>

The one end portion 1a of the anode 1 with the thin titanium film 10 formed thereon is immersed into an approximately 0.01 to 1 M aqueous solution of barium hydroxide, which is an aqueous electrolyte solution, held at approximately 70° C. to 180° C., and in this state the one end portion 1a was subjected to an electrochemical hydrothermal treatment at a constant voltage of approximately 3 to 50 V for about 1 to 240 hours to form a dielectric layer 3 as shown in FIG. 3(c). The aqueous solution of barium hydroxide serving as an aqueous electrolyte solution contains barium ions because of the use of barium hydroxide as a solute. In the dielectric layer 3 formed by hydrothermally treating the anode 1 while applying a voltage to the anode 1 in hot water, a first dielectric layer 3A and a second dielectric layer 3B can be formed in a single step. Therefore, the adhesion between the first dielectric layer 3A and the second dielectric layer 3B can be increased.

More specifically, through the hydrothermal treatment as described above, the surface of the anode 1 made of tantalum and the thin titanium film 10 are first concurrently anodized. During the time, the first dielectric layer 3A made of tantalum oxide ($Ta_2O_5$) consisting essentially of an amorphous component is formed on the surface of the anode 1 and the thin titanium film 10 is converted to a layer of titanium oxide ($TiO_2$). Then, when the hydrothermal treatment is continued while a voltage is applied to the anode 1, the first dielectric layer 3A further grows and the high-reactivity titanium oxide layer rapidly reacts with the aqueous solution of barium hydroxide, so that the second dielectric layer 3B formed of crystalline dielectric particles 33 made of barium titanate ($BaTiO_3$) is formed on the surface of the first dielectric layer 3A. In this embodiment, the titanium oxide layer produced prior to the formation of dielectric particles 33 of barium titanate is fully converted to the dielectric particles 33 of barium titanate. The relative dielectric constant of titanium oxide is approximately 90 which is lower than that of barium titanate. Therefore, the conversion of the thin titanium film 10 to dielectric particles 33 of barium titanate provides an efficiently increased dielectric constant of the second dielectric layer 3B.

In this embodiment, the first dielectric layer 3A formed in the above hydrothermal treatment step is made of tantalum oxide ($Ta_2O_5$) consisting essentially of an amorphous component and thus reduces the leakage current. Since the second dielectric layer 3B is formed by converting the thin titanium film 10 formed on the anode 1 to dielectric particles 33 having a higher dielectric constant than the first dielectric layer 3A, it can increase the dielectric constant of the entire dielectric layer 3.

Furthermore, in this embodiment, through the hydrothermal treatment step, the dielectric particles 33 are constituted by first dielectric particles 33S in contact with the first dielectric layer 3A and second dielectric particles 33L out of contact with the first dielectric layer 3A, and the first dielectric particles 33S have a smaller average particle diameter than the second dielectric particles 33L. The reason for this is not completely clear but can be assumed to be as follows: The hydrothermal treatment with the application of a voltage allows the second dielectric particles 33L to make more contact with the aqueous electrolyte solution during the hydrothermal treatment than the first dielectric particles 33S. Therefore, the barium ion concentration around the second dielectric particles 33L is increased to increase the particle growth speed and thus increase the particle diameter. When in this manner the average particle diameter of the second dielectric particles 33L is made greater than that of the first dielectric particles 33S, the dielectric constant of the second dielectric layer 3B can be efficiently increased, which also increases the dielectric constant of the entire dielectric layer 3. In addition, since the average particle diameter of the first dielectric particles 33S is smaller than that of the second dielectric particles 33L, the adhesion between the first dielectric layer 3A and the second dielectric layer 3B can be increased.

The thin titanium film 10 may contain zirconium or hafnium mixed therein. In the second dielectric layer 3B formed from a thin titanium film containing zirconium or hafnium mixed therein, the dielectric particles 33 made of barium titanate ($BaTiO_3$) have a crystal structure in which some of titanium atoms are substituted with zirconium or hafnium atoms. The above addition of zirconium or hafnium enables the control on the temperature dependency of the dielectric constant.

Instead of the above aqueous solution of barium hydroxide, an aqueous solution may be used in which at least one selected from the group consisting of magnesium, calcium, and strontium is added to an aqueous solution of barium hydroxide serving as an aqueous electrolyte solution. In the second dielectric layer 3B formed from a thin titanium film containing at least one of magnesium, calcium, and strontium added thereinto, the dielectric particles 33 made of barium titanate ($BaTiO_3$) have a crystal structure in which some of barium atoms are substituted with magnesium, calcium, or strontium atoms. The above addition of magnesium, calcium, or strontium enables the control on the temperature dependency of the dielectric constant.

Although in this embodiment barium hydroxide is used as a solute to be dissolved in the aqueous electrolyte solution, the solute for use is not limited to this and examples of other possible solutes include barium acetate, barium chloride, barium hydrogen phosphate, barium fluoride, barium sulfate, barium nitrate, barium carbonate, barium bromide, barium iodide, barium perchlorate, and barium oxalate. When such a solute allowing the aqueous electrolyte solution to contain barium ions is used and the pH or the like of the aqueous electrolyte solution is appropriately controlled, a dielectric layer 3 similar to that described above can be formed.

<Step 4: Formation of Electrolyte Layer>

As shown in FIG. 3(d), an electrolyte layer 4 is formed on the surface of the dielectric layer 3. The method for forming the electrolyte layer 4 using a conductive polymer for the electrolyte layer 4 is as follows: First, a precoat layer made of a conductive polymer, such as polypyrrole, is formed by chemical polymerization. Subsequently, a conductive polymer layer made of polypyrrole, for example, is formed on the surface of the precoat layer by electropolymerization. In this manner, a conductive polymer electrolyte layer 4 composed of a film stack of the precoat layer and the conductive polymer layer can be formed on the dielectric layer 3.

In the manufacturing method of this embodiment, the second dielectric particles 33L formed near to the electrolyte layer 4 are formed to have a greater average particle diameter than the first dielectric particles 33S. Thus, the voids between the second dielectric particles 33L can be increased in size, so that the adhesion between the dielectric layer 3 and the electrolyte layer 4 can be increased.

<Step 5: Formation of Cathode Extraction Layer>

As shown in FIG. 3(e), a carbon layer 5a is formed by applying a carbon paste to and in direct contact with the surface of the electrolyte layer 4, and a silver paste layer 5b is then formed by applying a silver paste to the carbon layer 5a. In this embodiment, the cathode extraction layer 5 is composed of the carbon layer 5a and the silver paste layer 5b.

<Step 6: Connection of Anode Terminal and Cathode Terminal>

As shown in FIG. 3(f), one end portion 7a of an anode terminal 7 is electrically and mechanically connected to the other end portion 1b of the anode 1 by welding or otherwise. Furthermore, one end portion 9a of a cathode terminal 9 is electrically and mechanically connected to a surface of the cathode extraction layer 5 by a conductive adhesive 8.

<Step 7: Molding Process>

As shown in FIG. 3(g), the product obtained after the completion of Steps 1 to 6 is encapsulated by transfer molding with a sealant containing epoxy resin and an imidazole compound to allow the anode and cathode terminals to be partly exposed to the outside, thereby forming a resin outer package 11. Specifically, the sealant is previously heated, poured into a mold, and cured in the mold. After the formation of the resin outer package 11, the exposed portions of the anode and cathode terminals are bent from the lateral sides of the resin outer package 11 to the bottom surface thereof, thereby forming terminal ends 7b and 9b to be used for soldering to a substrate.

In the manner described so far, a tantalum solid electrolytic capacitor 20 of the first embodiment is formed. Since the tantalum solid electrolytic capacitor 20 formed in the above manner increases the adhesion between the first dielectric layer 3A and the second dielectric layer 3B, it can reduce the leakage current.

For a solid electrolytic capacitor in which niobium or titanium is used as an anode, it can be assumed that even if a dielectric layer is formed in the above hydrothermal treatment step, the first dielectric layer will be converted to niobium oxide ($Nb_2O_5$) or titanium oxide ($TiO_2$) which have a high crystallinity, so that the leakage current will increase. For a solid electrolytic capacitor in which aluminum is used as an anode, it can be assumed that if the above hydrothermal treatment step is performed prior to the formation of a dielectric layer made of aluminum oxide on the surrounding surfaces of the anode, aluminum will react with barium hydroxide, resulting in the failure to the formation of the dielectric layer. In contrast, the anode 1 made of tantalum in the tantalum solid electrolytic capacitor 20 is stable in reaction with an aqueous electrolyte solution for use in the hydrothermal treatment step, compared to the anode made of niobium, titanium, or aluminum. It can be assumed that for this reason the advantageous dielectric layer 3 as described above can be formed.

In this embodiment, the dielectric layer 3 is formed to cover the surrounding surfaces of the one end portion 1a of the anode 1. However, for example, it is also possible that, of the side surfaces of the anode 1 in the form of a rectangular box, two opposed side surfaces thereof having the largest area have thin titanium films 10 formed thereon and dielectric layers 3 each including a first dielectric layer 3A and a second dielectric layer 3B are formed on the two opposed side surfaces in the hydrothermal treatment step. Also in this case, the effects of this embodiment can be provided.

Second Embodiment

Next, a description will be given of a second embodiment. Further explanation of the same elements as in the first embodiment described above will be omitted.

Figure 4:
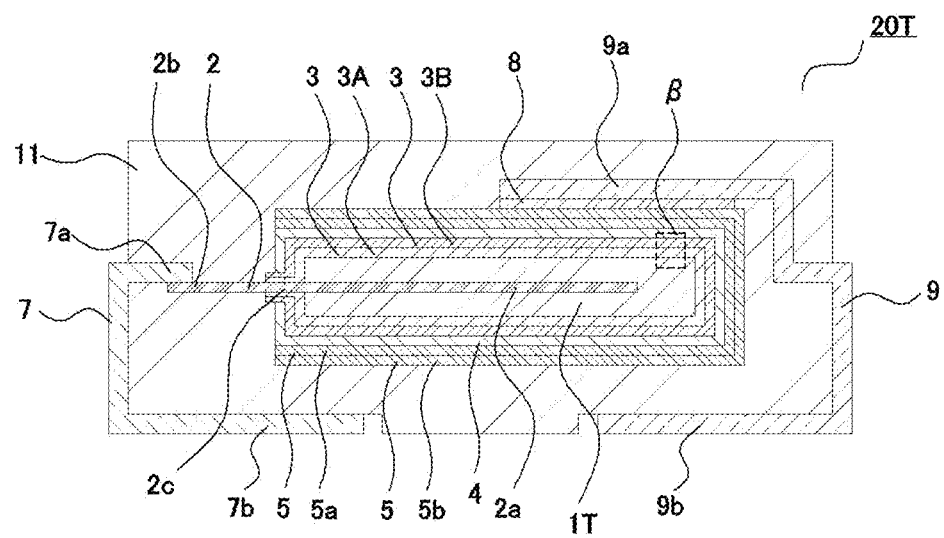
FIG. 4 shows schematic cross-sectional views for illustrating a tantalum solid electrolytic capacitor of a second embodiment.
Figure 4:
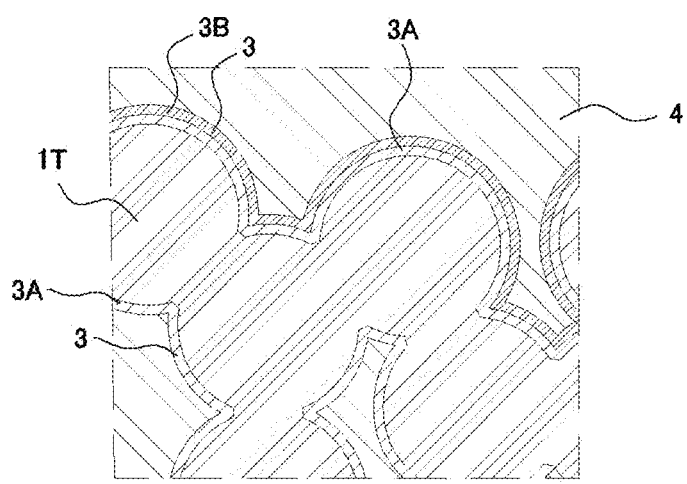

FIG. 4(a) is a schematic cross-sectional view for illustrating a tantalum solid electrolytic capacitor 20T of this embodiment.

Although in the above first embodiment a sheet of tantalum foil is used as an anode, a porous sintered body of tantalum particles is used instead as an anode 1T in this embodiment. The porous sintered body is produced by forming a large number of tantalum metal particles into a green anode body and sintering the green anode body. Also in this embodiment, the material for the porous sintered body forming the anode 1T is not limited to pure tantalum and may be an alloy of tantalum with another metal, like the first embodiment.

In this embodiment, the anode 1T has the outer shape of a rectangular box and, as shown in FIG. 4(a), is provided with an anode lead 2 so that one end portion 2a thereof is embedded into the anode 1T and the other end portion 2b thereof extends out of the anode 1T. The other end portion 2b of the anode lead 2 is connected to an anode terminal 7. The material for the anode lead 2 that can be used is tantalum or a tantalum-based alloy, like the anode 1T, but is not limited to these materials. Other examples of the material include valve metals, such as niobium, and alloys of valve metals including niobium. As just described, in this embodiment, any valve metal other than tantalum can also be used as a material for the anode lead 2.

The dielectric layer 3 is, as shown in FIG. 4(a), composed of a first dielectric layer 3A covering the anode 1T and a second dielectric layer 3B covering the first dielectric layer 3A and making contact with an electrolyte layer 4. The first dielectric layer 3A and the second dielectric layer 3B are also formed in this order on part of the other end portion 2b of the anode lead 2. Note that this figure schematically shows only a portion of the dielectric layer 3 which is formed on the outside surfaces of the anode 1T made of a porous sintered body and composed of the first and second dielectric layers 3A and 3B.

FIG. 4(b) is a schematic enlarged cross-sectional view of a region enclosed by the broken line β in FIG. 4(a), for illustrating the interior of the tantalum solid electrolytic capacitor 20T of this embodiment. As shown in this figure, the portion of the dielectric layer 3 composed of the first and second dielectric layers 3A and 3B is formed on the outside surfaces of the porous sintered body forming the anode 1T, and the remaining portions of the dielectric layer 3 composed only of the first dielectric layer 3A are formed on the wall surfaces of fine pores in the inside of the porous sintered body forming the anode 1T. The second dielectric layer 3B is formed of dielectric particles including first dielectric particles and second dielectric particles like the first embodiment, but the illustration of the dielectric particles is not given in this figure.

The electrolyte layer 4 is formed on the second dielectric layer 3B formed on the outside surfaces of the anode 1T and also formed on the portions of the first dielectric layer 3A formed on the wall surfaces of the fine pores in the anode 1T. Although in this embodiment the electrolyte layer 4 is formed to fill in the pores in the porous sintered body, the interiors of the pores may be partly devoid of the electrolyte layer 4.

In this embodiment, the leakage current can be reduced by the first and second dielectric layers 3A and 3B formed on the outside surfaces of the anode 1T.

Alternatively, the dielectric layer 3 may be composed, also in the portions thereof formed on the wall surfaces of the fine pores in the porous sintered body forming the anode 1T, of the first dielectric layer 3A and the second dielectric layer 3B. In this case, the leakage current can be more efficiently reduced.

As seen from the above, the tantalum solid electrolytic capacitor 20T of this embodiment can provide the same effects as the tantalum solid electrolytic capacitor of the first embodiment.

In addition, in this embodiment, the portion of the dielectric layer 3 composed of the first and second dielectric layers 3A and 3B is formed to extend from the anode 1T halfway along the other end portion 2b of the anode lead 2. The region of the dielectric layer near to the extended portion of the anode lead 2 is likely to cause defects. Since this region is composed of the first and second dielectric layers 3A and 3B, the effect of reducing the leakage current of the tantalum solid electrolytic capacitor 20T can be increased.

(Manufacturing Method of Tantalum Solid Electrolytic Capacitor of Second Embodiment)

Hereinafter, a description will be given of a method for manufacturing the tantalum solid electrolytic capacitor of this embodiment.

The following description will be given of Steps 1, 2, and 6 different from those in the first embodiment. Further explanation of the same steps as in the first embodiment described above will be omitted.

<Step 1: Formation of Anode>

A plurality of tantalum metal particles having a primary particle diameter of approximately 0.5 μm and a secondary particle diameter of approximately 100 μm are used as a material for an anode 1T. The tantalum metal particles are formed into an anode green body with one end portion 2a of an anode lead 2 embedded thereinto, and the anode green body is sintered in vacuum to produce an anode 1T made of a porous sintered body. Thus, the other end portion 2b of the anode lead 2 is fixed in a state extended out of one surface of the anode 1T. The anode 1T made of a porous sintered body thus formed has the outer shape of a rectangular box with a length of 4.4 mm, a width of 3.3 mm, and a thickness of 1.0 mm.

<Step 2: Formation of Thin Titanium Film>

A thin titanium film 10 is formed, by sputtering or otherwise, on the outside surfaces of the anode 1T and a portion of the surface of the other end portion 2b of the anode lead 2. In this embodiment, a mask is applied to a region of the other end portion 2b of the anode lead 2 where the anode terminal 7 is to be connected and, therefore, the thin titanium film 10 is not formed on this region. However, the thin titanium film 10 may also be formed on this region.

When the thin titanium film 10 is formed in the above manner, a dielectric layer 3 composed of a first dielectric layer 3A covering the anode 1T and a second dielectric layer 3B covering the first dielectric layer 3A and making contact with an electrolyte layer 4 can be formed on the outside surfaces of the anode 1T in the step of forming the dielectric layer 3. Since in this embodiment the thin titanium film 10 is also formed on a portion of the surface of the other end portion 2b of the anode lead 2, the first and second dielectric layers 3A and 3B are formed in this order also on the portion of the surface of the other end portion 2b of the anode lead 2. The remaining portions of the dielectric layer 3 formed on the surfaces of fine pores in the anode 1T made of a porous sintered body are each composed of a first dielectric layer 3A.

Next, Steps 3 to 5 common to the first embodiment are performed and Step 6 is then performed in the following manner.

<Step 6: Connection of Anode Terminal and Cathode Terminal>

One end portion 7a of an anode terminal 7 is electrically and mechanically connected to the other end portion 2b of the anode lead 2 by welding or otherwise. Furthermore, one end portion 9a of a cathode terminal 9 is electrically and mechanically connected to a surface of the cathode extraction layer 5 by a conductive adhesive 8.

In the manner described so far, a tantalum solid electrolytic capacitor 20T of the second embodiment is formed.

Modification of Second Embodiment

Next, a description will be given of a modification of the second embodiment. Further explanation of the same elements as in the first and second embodiments described above will be omitted.

Figure 5:
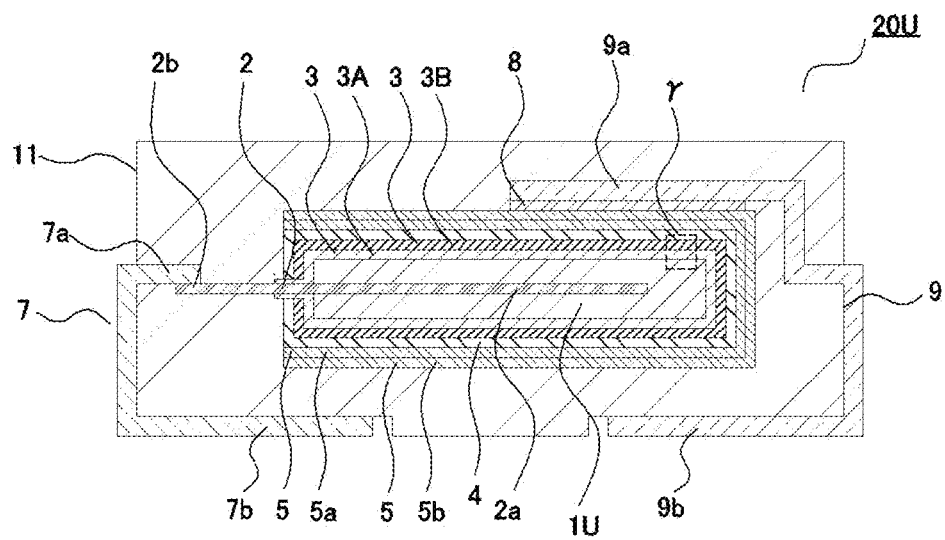
FIG. 5 shows schematic cross-sectional views for illustrating a tantalum solid electrolytic capacitor of a modification of the second embodiment.
Figure 5:
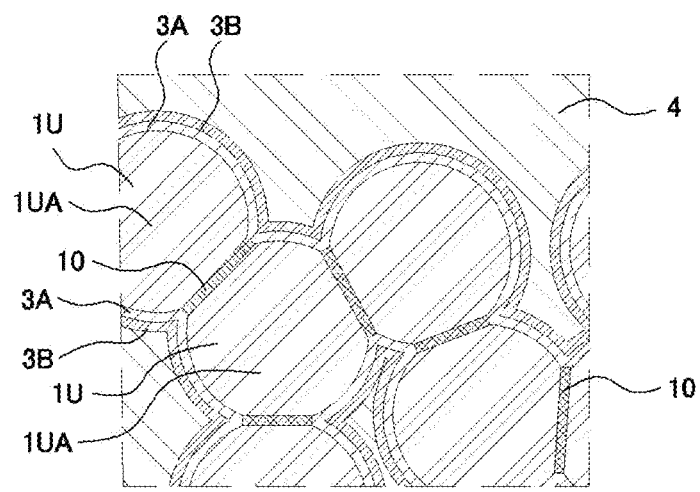

FIG. 5(a) is a schematic cross-sectional view for illustrating a tantalum solid electrolytic capacitor 20U of this modification. The anode 1U is formed of a porous sintered body of tantalum metal particles, like the second embodiment. FIG. 5(b) is a schematic enlarged cross-sectional view of a region enclosed by the broken line γ in FIG. 5(a), for illustrating the interior of the tantalum solid electrolytic capacitor 20U of this modification. As shown in FIG. 5(a), a dielectric layer 3 composed of a first dielectric layer 3A and a second dielectric layer 3B is formed on the outside surfaces of the porous sintered body forming the anode 1U and the surfaces of fine pores in the porous sintered body forming the anode 1U. An electrolyte layer 4 is formed on the surface of the second dielectric layer 3B. Thin titanium films 10 are formed between the adjoining tantalum metal particles 1UA. Therefore, the adjoining tantalum metal particles forming the anode 1U are electrically connected through the thin titanium films 10.

As seen from the above, the tantalum solid electrolytic capacitor 20U of this embodiment can provide the same effects as the tantalum solid electrolytic capacitor of the first modification.

In addition, in this modification, the dielectric layer 3 composed of a first dielectric layer 3A and a second dielectric layer 3B is formed on the wall surfaces of the fine pores in the porous sintered body forming the anode 1U. In this case, the leakage current of the tantalum solid electrolytic capacitor 20U can be efficiently reduced.

(Manufacturing Method of Tantalum Solid Electrolytic Capacitor of Modification of Second Embodiment)

Hereinafter, a description will be given of a method for manufacturing the tantalum solid electrolytic capacitor of this modification.

The following description will be given of Steps 1 and 2 different from those in the second embodiment. In this modification, Step 1 is performed next to Step 2. Further explanation of the same steps as in the second embodiments described above will be omitted.

<Step 2: Formation of Thin Titanium Film>

Thin titanium films 10 are formed, by sputtering or otherwise, on the surfaces of tantalum metal particles 1UA with a primary particle diameter of approximately 0.5 μm and a secondary particle diameter of approximately 100 μm.

<Step 1: Formation of Anode>

The tantalum metal particles 1UA each having the above thin titanium film 10 formed thereon are formed, with one end portion 2a of an anode lead 2 embedded therein, into an anode green body, and the anode green body is sintered in vacuum to produce an anode 1U made of a porous sintered body. The exposed surface of the anode 1U thus produced is provided with a thin titanium film 10 and the grain boundaries of the tantalum metal particles 1UA forming the anode 1U are also provided with thin titanium films 10.

When the anode 1U is then subjected to the above-described hydrothermal treatment, a dielectric layer 3 composed of a first dielectric layer 3A and a second dielectric layer 3B can be uniformly formed on the outside surfaces of the porous sintered body forming the anode 1U and also on the wall surfaces of the fine pores in the porous sintered body forming the anode 1U. During the hydrothermal treatment step, the thin titanium films 10 at the grain boundaries of the tantalum metal particles 1UA do not make contact with an aqueous electrolyte solution and are therefore left unreacted with the aqueous electrolyte solution. This increases the adhesion between the tantalum metal particles 1UA forming the anode 1U.

In the manner described so far, a tantalum solid electrolytic capacitor 20U of the modification of the second embodiment is formed.

(Evaluation)

Evaluation samples were produced to check the leakage current in the dielectric layer of the tantalum solid electrolytic capacitor of the first embodiment and the dielectric constant of the dielectric layer.

Figure 6:
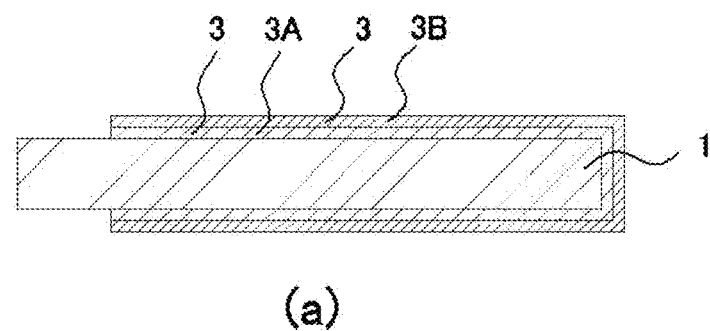
FIG. 6 shows a cross-sectional view schematically showing a solid electrolytic capacitor used as an evaluation sample and an explanatory view schematically showing an evaluation method.
Figure 6:
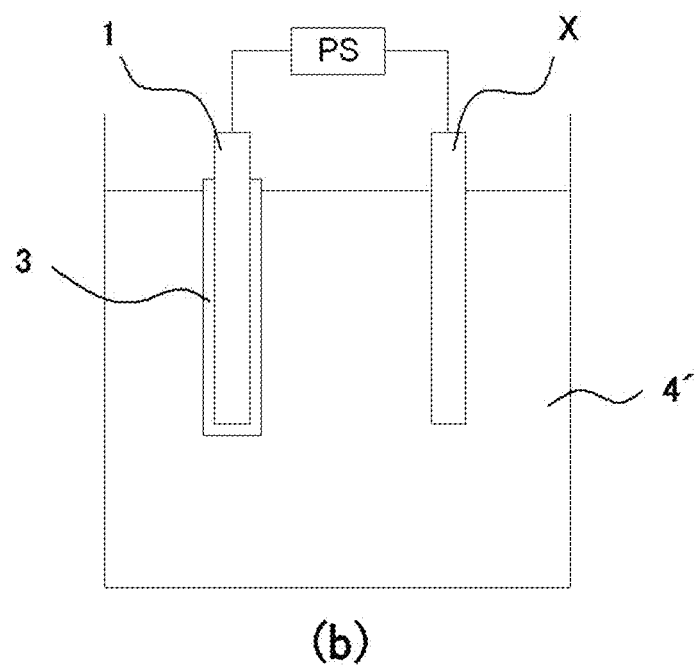

FIG. 6(a) is a cross-sectional view schematically showing a solid electrolytic capacitor used as an evaluation sample. As shown in FIG. 6(a), the evaluation sample includes an anode 1 and a dielectric layer 3 which are basic components of the solid electrolytic capacitor of the above embodiment. FIG. 6(b) is an explanatory view schematically showing a method for measuring the leakage current of the evaluation sample. The anode 1 with the dielectric layer 3 formed thereon, provided as an evaluation sample, and an electrode X for a cathode were immersed into an aqueous electrolyte solution 4', and the aqueous electrolyte solution 4' and the electrode X were made serve as an electrolyte and a cathode, respectively, to measure the leakage current flowing through the dielectric layer 3. Therefore, with such a structure as the evaluation sample in which the dielectric layer 3 is sequentially formed on the anode 1, the leakage current of the tantalum solid electrolytic capacitor of the above embodiment can be checked and evaluated.

(Evaluation Sample 1)

Hereinafter, a description will be given of Evaluation Sample 1 of the tantalum solid electrolytic capacitor of the first embodiment.

<Step 1: Formation of Anode>

The material used as the anode 1 was a sheet of tantalum foil in the shape of a rectangular box with a length of 40 mm, a width of 20 mm, and a thickness of 0.1 mm.

<Step 2: Formation of Thin Titanium Film>

A thin titanium film with a thickness of approximately 50 nm was formed on one end portion of the anode by sputtering.

<Step 3: Formation of Dielectric Layer>

The one end portion of the anode with the thin titanium film formed thereon was immersed into a 0.5 M aqueous solution of barium hydroxide kept at approximately 150° C. and hydrothermally treated at a constant voltage of approximately 30 V for about 12 hours to form a dielectric layer.

Figure 7:
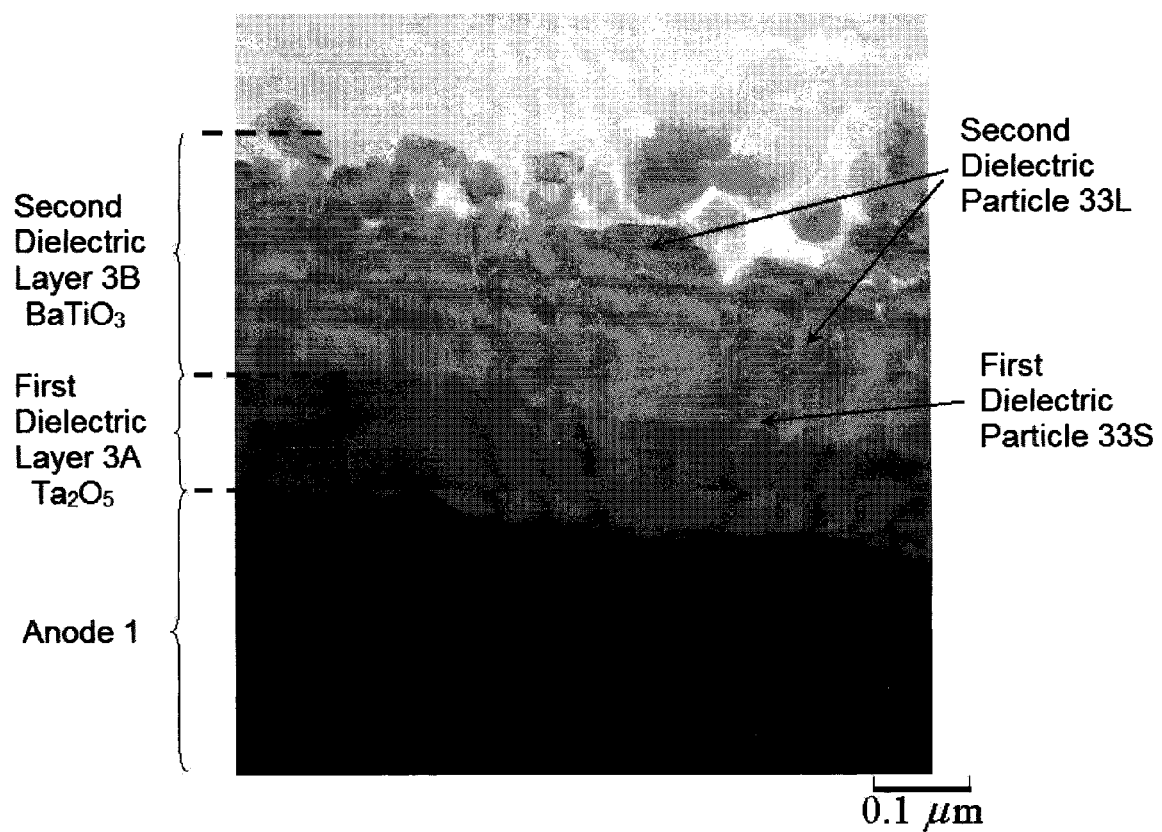
FIG. 7 shows an image of a dielectric layer of Evaluation Sample 1 obtained by cross-sectional observation using a transmission electron microscope.

FIG. 7 is an image of the formed dielectric layer 3 obtained by cross-sectional observation with a transmission electron microscope (TEM).

As shown FIG. 7, the dielectric layer 3 is composed of a first dielectric layer 3A and a second dielectric layer 3B, and the second dielectric layer 3B is formed of dielectric particles 33. Of the dielectric particles 33, ten of first dielectric particles 33S in contact with the first dielectric layer 3A were randomly selected and measured in terms of particle diameter. The average particle diameter of the ten first dielectric particles 33S obtained by averaging the measured particle diameters was 26 nm. On the other hand, ten of second dielectric particles 33L out of contact with the first dielectric layer 23A were randomly selected and measured in terms of particle diameter. The average particle diameter of the ten second dielectric particles 33L obtained by averaging the measured particle diameters was 105 nm. The above selections of the first and second dielectric particles 33S and 33L were made from the same cross section.

Furthermore, the first and second dielectric layers 3A and 3B were evaluated for composition with an X-ray microanalyzer. As a result, the detected compositions of the first and second dielectric layers 3A and 3B exhibited a composition of tantalum oxide and a composition of barium titanate, respectively. Moreover, the first and second dielectric layers 3A and 3B were evaluated for crystallinity with an X-ray diffractometer. As a result, it was found that the first dielectric layer 3A was amorphous tantalum oxide and the second dielectric layer 3B was crystalline barium titanate.

(Evaluation Sample 2)

Evaluation Sample 2 of a conventional tantalum solid electrolytic capacitor was produced in the same manner as in Evaluation Sample 1, except that Step 2 for Evaluation Sample 1 was not performed and the following Step 3A was performed in place of Step 3 for Evaluation Sample 1.

<Step 3A: Formation of Dielectric Layer>

The one end portion of the anode was immersed into an approximately 0.02% by weight of aqueous solution of phosphoric acid kept at approximately 25° C. and anodized at a constant voltage of approximately 30 V for about two hours to form a dielectric layer. In Evaluation Sample 2, the dielectric layer is composed of a single dielectric layer formed in the above manner. The dielectric layer was checked for composition and crystallinity in the same manners as described above. As a result, it was found that the dielectric layer was tantalum oxide made of an amorphous component.

(Evaluation Sample 3)

Evaluation Sample 3 was produced in the same manner as in Evaluation Sample 1, except that Step 2 for Evaluation Sample 1 was not performed and the following Step 1A was performed in place of Step 1 for Evaluation Sample 1.

<Step 1A: Formation of Anode>

The material used as the anode 1 was a sheet of titanium foil in the shape of a rectangular box with a length of 40 mm, a width of 20 mm, and a thickness of 0.1 mm.

In Evaluation Sample 3, the dielectric layer is composed of a first dielectric layer and a second dielectric layer. The dielectric layer was checked for composition and crystallinity in the same manners as described above. As a result, it was found that the first dielectric layer was crystalline titanium oxide and the second dielectric layer was crystalline barium titanate. Furthermore, when a cross section of the dielectric layer was observed with a transmission electron microscope (TEM), it was found that the second dielectric layer was formed of dielectric particles, most of the dielectric particles were formed in contact with the first dielectric layer, and the second dielectric layer had no particle diameter distribution of dielectric particles. The reason for the growth of dielectric particles as just described is not completely clear, but can be attributed to the fact that titanium in bulk form was hydrothermally treated.

When ten of the dielectric particles were randomly selected and measured in terms of particle diameter, it was found that the average particle diameter of the ten dielectric particles was 200 nm.

(Evaluation Sample 4)

Evaluation Sample 4 was produced in the same manner as in Evaluation Sample 1, except that the following Step 3B was performed in place of Step 3 for Evaluation Sample 1.

<Step 3B: Formation of Dielectric Layer>

The one end portion of the anode was immersed into an approximately 0.02% by weight of aqueous solution of phosphoric acid kept at approximately 25° C. and anodized at a constant voltage of approximately 30 V for about two hours to form a first dielectric layer.

Next, the anode with the above first dielectric layer formed thereon was immersed into a 0.5 M aqueous solution of barium hydroxide kept at approximately 150° C. and hydrothermally treated for about 12 hours to form a second dielectric layer.

In Evaluation Sample 4, the dielectric layer is composed of a first dielectric layer, a second dielectric layer, and a third dielectric layer formed between the first and second dielectric layers. The dielectric layer was checked for composition and crystallinity in the same manners as described above. As a result, it was found that the first dielectric layer was amorphous tantalum oxide, the third dielectric layer was crystalline titanium oxide, and the second dielectric layer was crystalline barium titanate. Furthermore, when a cross section of the dielectric layer was observed with a transmission electron microscope (TEM), it was found that the second dielectric layer was formed of dielectric particles, most of the dielectric particles were formed in contact with the third dielectric layer, and the second dielectric layer had no particle diameter distribution of dielectric particles. It can be assumed that the reason for the formation of the third dielectric layer is that since the hydrothermal treatment was performed without voltage application, the reaction of titanium oxide produced from the thin titanium film did not sufficiently progress and, therefore, titanium oxide remained as the third dielectric layer. On the other hand, the reason for no particle diameter distribution of dielectric particles in the second dielectric layer can be attributed to the fact that the hydrothermal treatment was performed without voltage application.

When ten of the dielectric particles were randomly selected and measured in terms of particle diameter, it was found that the average particle diameter of the ten dielectric particles was 60 nm.

(Measurement of Leakage Current and Calculation of Dielectric Constant)

A voltage of 10 V was applied across the electrodes shown in FIG. 6(b) for each of Evaluation Samples 1 to 4, and the leakage current was measured 50 seconds after the voltage application. Next, for each of Evaluation Samples 1 to 4, an alternating voltage of 100 mV at 120 Hz was applied across the electrodes shown in FIG. 6(b) to measure the capacitance. Based on the measured capacitance and the thickness of the entire dielectric layer measured by cross-sectional observation with a scanning electron microscope (SEM), the relative dielectric constant of the entire dielectric layer was calculated.

The above measurement and calculation results are shown in TABLE 1. In TABLE 1, the values of leakage current are relative values with respect to that of Evaluation Sample 2 being taken as 100.

TABLE 1

| | Leakage Current | Relative Dielectric Constant ($\epsilon_r$) |
|---|---|---|
| Evaluation Sample 1 | 4 | 109 |
| Evaluation Sample 2 | 100 | 24 |
| Evaluation Sample 3 | 36520 | 791 |
| Evaluation Sample 4 | 38 | 107 |

As shown in TABLE 1, Evaluation Sample 1 of the tantalum solid electrolytic capacitor of the first embodiment could reduce the leakage current, compared to Evaluation Sample 2 of the conventional tantalum solid electrolytic capacitor in which the dielectric layer was composed only of a tantalum oxide layer. Furthermore, Evaluation Sample 1 could increase the dielectric constant of the dielectric layer, compared to Evaluation Sample 2.

Evaluation Sample 3 increased the dielectric constant of the dielectric layer but significantly increased the leakage current, compared to Evaluation Sample 2 of the conventional solid electrolytic capacitor.

Evaluation Sample 4 reduced the leakage current compared to Evaluation Sample 2, but its leakage current was about one third of that of Evaluation Sample 2. Evaluation Sample 1 of the first embodiment reduced the leakage current to about one tenth of that of Evaluation Sample 4.

What is claimed is:

1. A method for manufacturing a solid electrolytic capacitor, the method comprising the steps:
   forming an anode made of tantalum or a tantalum-based alloy;
   forming a thin titanium film on a surface of the anode;
   hydrothermally treating the anode with the thin titanium film formed thereon while applying a voltage to the anode in an aqueous electrolyte solution, thereby anodizing the anode to form a first dielectric layer consisting essentially of an amorphous component and form a second dielectric layer converted from the thin titanium film, making contact with the first dielectric layer, and formed of dielectric particles having a higher dielectric constant than the first dielectric layer; and
   forming an electrolyte layer on the surface of the second dielectric layer.

2. The method for manufacturing a solid electrolytic capacitor according to claim 1, wherein the step of hydrothermally treating the anode is performed so that the dielectric particles are constituted by first dielectric particles in contact with the first dielectric layer and second dielectric particles out of contact with the first dielectric layer and the first dielectric particles have a smaller average particle diameter than the second dielectric particles.

3. The method for manufacturing a solid electrolytic capacitor according to claim 1, wherein the step of hydrothermally treating the anode comprises the step of forming dielectric particles made of barium titanate, using an aqueous electrolyte solution containing barium ions.

4. The method for manufacturing a solid electrolytic capacitor according to claim 3, wherein the step of hydrothermally treating the anode comprises the steps of reacting and converting all of titanium oxide produced in the step of hydrothermally treating the anode into barium titanate.

* * * * *